United States Patent [19]

Davidson

[11] Patent Number: 5,474,323
[45] Date of Patent: Dec. 12, 1995

[54] PASSENGER AIR BAG MODULE WITH SNAP-ATTACHMENT DEPLOYMENT COVER

[75] Inventor: Phillip K. Davidson, Novi, Mich.

[73] Assignee: Takata, Inc., Auburn Hills, Mich.

[21] Appl. No.: 255,410

[22] Filed: Jun. 8, 1994

[51] Int. Cl.[6] .................................................. B60R 21/16
[52] U.S. Cl. ........................................................ 280/728.2
[58] Field of Search ............................ 280/728 R, 728 A, 280/728 B, 732, 728.1, 728.2, 728.3; 220/253

[56] References Cited

U.S. PATENT DOCUMENTS

| | | | |
|---|---|---|---|
| 4,828,286 | 5/1989 | Föhl | 280/731 |
| 4,941,678 | 7/1990 | Lauritzen et al. | 280/732 |
| 4,989,897 | 2/1991 | Takada | 280/728 B |
| 5,167,427 | 12/1992 | Baba | 280/728 A |
| 5,201,541 | 4/1993 | Jones et al. | 280/731 |
| 5,275,432 | 1/1994 | Pray et al. | 280/728 A |
| 5,303,951 | 4/1994 | Goestenkors et al. | 280/728 B |
| 5,312,129 | 5/1994 | Ogawa | 280/728 A |
| 5,312,130 | 5/1994 | Baba | 280/728 B |
| 5,342,090 | 8/1994 | Sobczak et al. | 280/728 B |
| 5,348,339 | 9/1994 | Turner | 280/732 |

*Primary Examiner*—Margaret A. Focarino
*Assistant Examiner*—Paul N. Dickson
*Attorney, Agent, or Firm*—Harness, Dickey & Pierce

[57] ABSTRACT

An improved passenger air cushion module having a module cover which snap-fit engages to a corresponding complementary module reaction canister which eliminates the need for fasteners or retaining clips and brackets when assembling the cover to the canister, and particularly retains the cover to the canister in a manner which allows for aesthetic and mating flush-mount engagement of the cover with corresponding vehicle structure supporting the canister module. Such a passenger air bag module further provides for positive retention of the cover to the canister during deployment of an air cushion, namely an air bag, from within the module in response to a sensed vehicle collision.

10 Claims, 3 Drawing Sheets

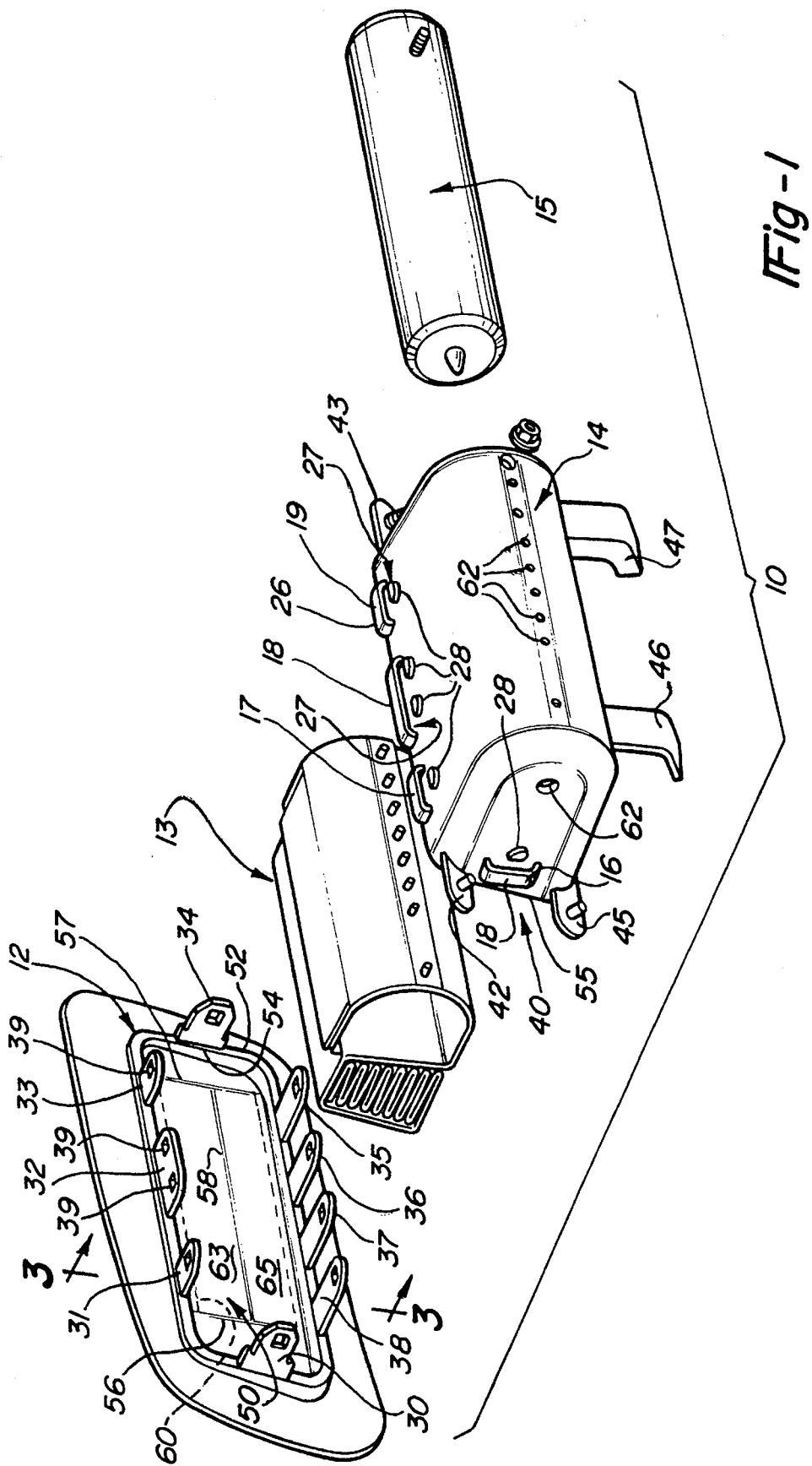

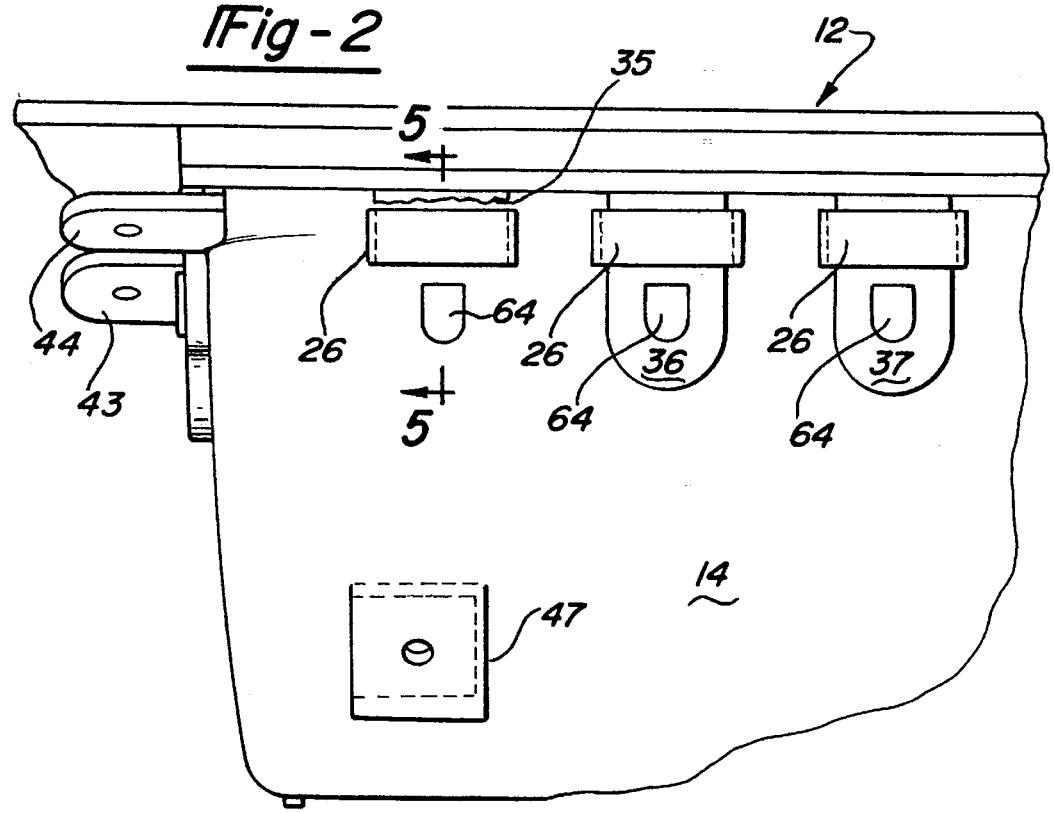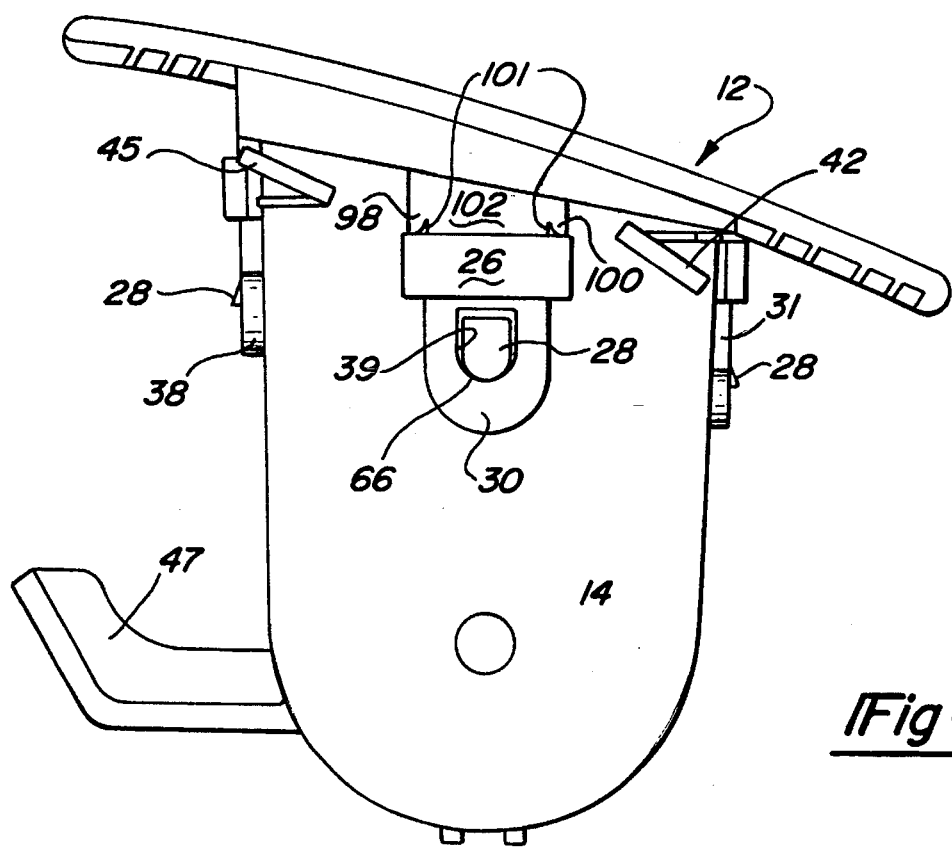

5,474,323

PASSENGER AIR BAG MODULE WITH SNAP-ATTACHMENT DEPLOYMENT COVER

FIELD OF THE INVENTION

This invention relates generally to inflatable motor vehicle occupant restraint systems, and more particularly to an improved cover assembly through which an air bag is deployed.

BACKGROUND OF THE INVENTION

A conventional module for housing an air cushion restraint system in a vehicle instrument panel has a cover or deployment door which attaches to a housing or canister in which an air bag and inflator are housed. Most commonly, a plurality of threaded studs extend from the canister about its mouth and the cover has corresponding complementary holes which mate with the studs. A reinforcement plate is then mated with studs and threadingly retained by nuts to trap the cover between the plate and canister. By trapping the cover to the canister along at least a pair of primary opposed edges, the cover is securely retained to the canister even during deployment of an air bag through rip seams formed in the cover. Preferably, a rip seam pattern defines a pair of opposed deployment doors in the cover with edge hinges for integrally retaining each door in hinged relation with the canister during air bag deployment. However, such systems require a large number of separate pieces when assembling the cover to the canister which increases assembly time and component expense. Use of a plurality of separate fasteners and support bracketry also complicates the assembly and repair. Furthermore, retention of a cover to a canister with threaded studs often requires checking for inadvertent cross-threading of the studs during assembly in order to verify proper assembly. Furthermore, the presentation of an air bag can be modified when the cover separates from the canister during deployment which varies the restraint performance from a designed and expected performance.

An alternative method for retaining a cover to a canister includes mounting the canister to a vehicle instrument panel support structure and separately fastening the cover to adjacent surrounding instrument panel structure such that the cover and canister are engaged in abutment but are not actually physically retained together.

In another version, one edge of an air bag module cover is retained to a canister by trapping it against the canister with threaded fasteners and a reinforcement plate. The opposite edge is then snap-fit engaged with the corresponding opposite edge of the canister in order to facilitate assembly and to reduce the number of parts in the system. However, such a system can not be totally snap-assembled to a canister in a quick and efficient manner so that separate fasteners and plate reinforcement assemblies are not needed when retaining the cover to the canister.

An even further version utilizes a cover which snap-fit engages to a housing with tabs to eliminate these fasteners. However, the entire face of the cover separates from the tabs along one entire edge, and a hinge is formed adjacent the tabs on the opposite edge such that the entire cover face forms a pivoting door for deployment of an air bag. Such a design does not fully circumferentially retain the cover to the canister during air bag deployment.

Further methods are available for retaining a cover to a canister when constructing a passenger air bag module, for example, a plurality of rivets can be used to trap a cover to a canister about its mouth. When rivets are used, there is often concern over the quality of the assembled rivets, as well as the integrity of the riveted assembly, namely its reliability and strength when subjected to forces and loads generated during an air bag's deployment through the cover.

Additional complications exist when utilizing fasteners and reinforcing plates to secure an air bag cover to a canister. For example, threaded fasteners are susceptible of loosening from vibration as a vehicle travels over a bumpy road and therefore require use of a thread binding agent or a lock washer to prevent loosening. This further increases the number of parts, complicates the assembly, and adds to cost and time required for assembly. As a result, such systems for attaching a cover to a canister tend to be less feasible when constructing air bag modules for use in high volume and low cost applications.

SUMMARY OF THE INVENTION

In order to solve the problems of the aforementioned prior art, it is an object of the present invention to provide an improved passenger air cushion module for use in retaining an air cushion restraint system for presentment to a motor vehicle occupant which has a module cover providing deployment doors which snap-fits with a module reaction canister to retain the cover to the canister, especially during the deployment of an air cushion through the deployment doors in response to a sensed vehicle crash. Such a system provides an air bag module which eliminates the need for fasteners when assembling the module cover to the canister, and deploys an air bag through the cover face while retaining the cover about its periphery to the canister. By eliminating fasteners and providing for a snap-together design for a substantially one-piece injection molded plastic cover, the number of assembly components can be reduced and the operations required to assemble the module can be simplified. Furthermore, proper fastener assembly is more readily assured, allowing elimination of additional verification steps during assembly. Additionally, a module cover can be injection molded from a single piece of material to integrally form plastic deployment doors, and a single die-cast alloy reaction canister can be provided which snap-engages with the cover to form the passenger air bag module. Furthermore, the module is designed to prevent inadvertent upside-down or backward installation of the module cover to the canister.

According to the present invention, a plurality of complementary pairs of mating fasteners are provided on the cover and canister, one fastener provided on the peripheral portion of the cover and the other complementary fastener provided on the canister adjacent its mouth opening, such that each pair of fasteners align and couple in one-way snap-action engagement, which requires physically manipulating and biasing apart of the mating portions in order to decouple the fasteners when removing the cover from the canister. The first fastener is preferably formed on the canister and is formed by a receiving portion having a guide portion and a latch portion, with the latch portion sloped upwardly in the shape of an ascending wedge. The second fastener in each pair is constructed from an insert latch which forms a generally male shaped member having a receiving hole which is guided through the first fastener guide portion and which ramp slopes the insert latch upwardly against the latch portion where it is resiliently bent until it snap-engages with the latch portion when the receiving hole clears the latch portion. The pair of mating fasteners thereby allow for insertion but resist removal of the insert latch from the receiving portion. Preferably, the insert latch extends from the cover from which it is formed. Preferably, each male insert latch is molded integrally with the air bag deployment cover, and is shaped to fit directly into the guide portion of a respective receiving portion.

Therefore, the snap-action cover-to-canister engagement of the air bag module of this invention provides for quick and easy attachment of a module cover to a module reaction canister which eliminates the need for costly mounting brackets and fasteners when retaining the cover and deployment doors to a canister. Furthermore, this device eliminates a number of assembly operations which are normally required when constructing an air bag module. As a result, the snap-together design of this invention reduces the cost of fasteners and components required when constructing the air bag module yet still fully circumferentially retains the cover to the canister even during air bag deployment. Further advantages are provided due to a corresponding reduction in assembly time and a reduction in resulting scrap material when forming same.

Objects, features and advantages of this invention are to provide an improved passenger air cushion support and assembly module for receiving an air cushion restraint system having an air bag and a pressurized gas source for inflating the air bag wherein a cover with a deployment door snap-action engages with a reaction canister through a complementary pair of mating fastening portions. The design provides for one-shot molding of the cover from a soft and resilient resin material which can be snap-fit engaged to a complementary canister and which assures cover retention during deployment of an air bag through the cover deployment doors. Further benefits are provided by retaining the cover to the canister in a fully circumferential manner which enhances cover-to-canister connection during deployment of an air bag through the cover and provides a cover which is lightweight, strong, easy to assemble to a canister, rugged, durable, readily and easily assembled, and is of a simplified design and is easy and economical to manufacture and assemble, and prevents inadvertent upside-down assembly to a corresponding canister.

Further objects, features and advantages of the invention will become apparent from a consideration of the following description and the appended claims when taken in connection with the accompanying drawings.

BRIEF DESCRIPTION OF THE DRAWINGS

FIG. 1 is an exploded schematic perspective view of a passenger air cushion module incorporating the snap-action engaging module cover and complementary module reaction canister of this invention which retains a folded air bag and gas generating inflation module and mounts to a vehicle instrument panel structure;

FIG. 2 is a partial plan view of the assembled passenger air bag module taken generally along line 2—2 of FIG. 1 showing one of the cover male insert portions broken away;

FIG. 3 is an end view of the assembled air bag module of FIGS. 1 and 2;

DETAILED DESCRIPTION OF THE PREFERRED EMBODIMENT

Figure 4:
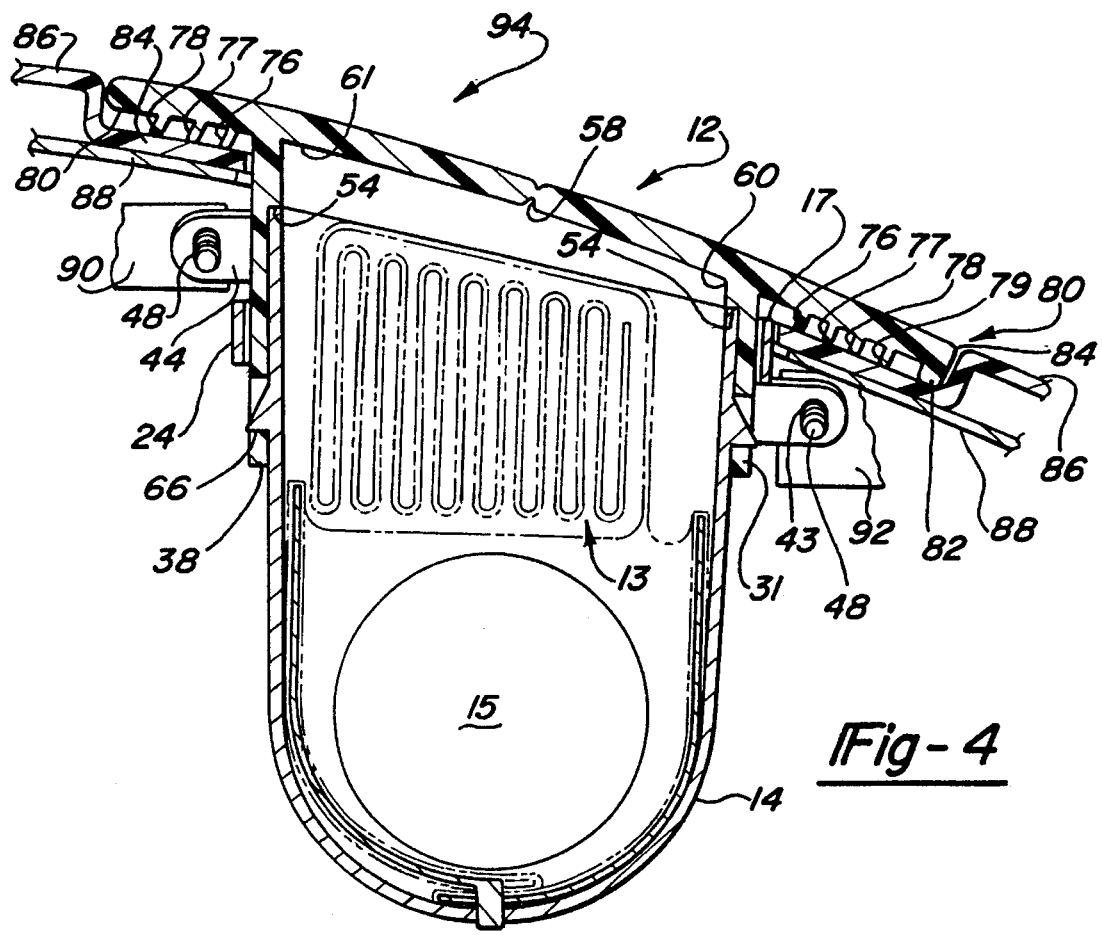
FIG. 4 is a cross-sectional view of the assembled air bag module depicted in FIGS. 1, 2 and 3 taken generally along line 4—4 of FIG. 1.
Figure 5:
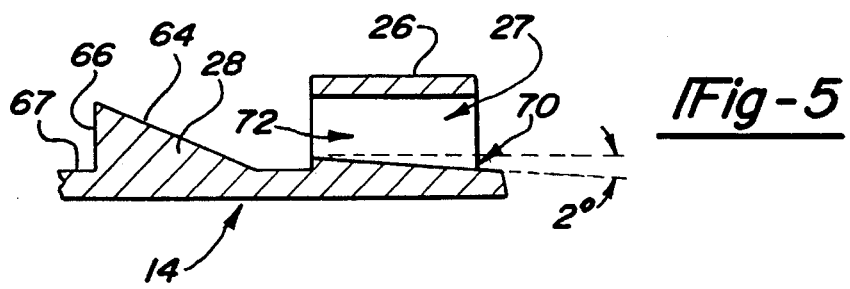
FIG. 5 is a partial cross-sectional view taken along line 5—5 of FIG. 2.

For applications where it is desirable to snap-fit an air cushion module cover to a module reaction canister, an improved air bag module is provided which securely retains a cover to an air bag canister which is then mounted to a support structure in a vehicle interior. The cover is fully circumferentially snap-fit to the canister with connectors such that deployment of an air cushion through deployment doors in the cover assures the complete circumferential retention of the cover to the canister during deployment of the air bag. Preferably, the module reaction canister is fastened to a support structure in a vehicle instrument panel and the module cover snap fit engages with the canister in substantially flush relation with an instrument panel outer skin to retain and house a passenger air bag and inflator module. Alternatively, the air bag module of this invention can be formed with a modified canister to allow packaging in a vehicle door or side structure when deploying an air bag for an occupant during a side impact.

In accordance with a preferred embodiment of this invention, a passenger air bag module 10, as shown in FIGS. 1–3, is formed from a module cover 12 which snap-fit engages with a module reaction canister 14 in which is retained a folded air bag 13 and inflator module 15. The cover snap-fit engages with the canister through a plurality of complementary mating portions, namely female receiving portions 16–24 which are each formed from a guide 26 having a through-slot 27 and a latch 28, and complementary male insert portions 30–40 which each have a receiving hole 39. Preferably, the female receiving portions 16–24 are arranged about a mouth 40 formed from canister 14. Likewise, the male insert portions 30–38 are arranged to extend from module cover 12 such that each male insert portion aligns with a respective female receiving portion for snap-fit engagement of the cover to the canister. A plurality of mounting ears 42–47 extend from the canister, each having a threaded bore 48 which allows for threaded fastening of the canister to an instrument panel support structure which retains the air bag module 10 in an instrument panel for presentation to a passenger in response to a detected vehicle crash.

Figure 6:
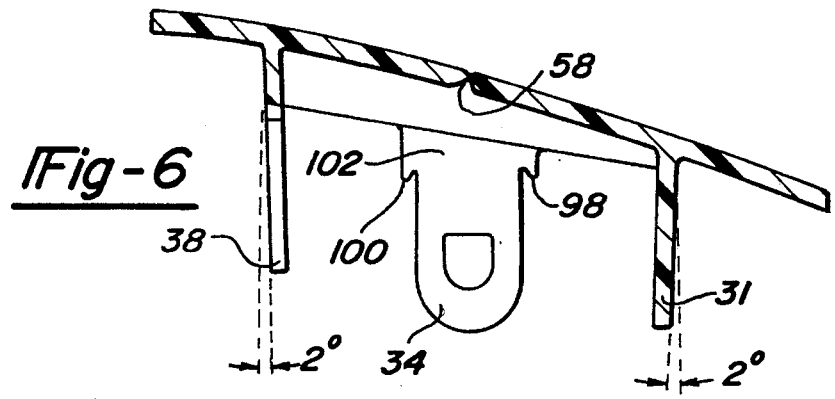
FIG. 6 is a cross-sectional view of the unassembled cover depicted in FIGS. 1–3 corresponding with the view of FIG. 4.

As shown in FIGS. 1, 4, and 6, module cover 12 is preferably formed from one-shot injection molded plastic to provide a front face portion 50 having a circumferential lip 52 provided on a back face from which the male insert portions 30–38 extend in spaced apart arrangement. Preferably, a ledge 54 is formed at the base of each male insert 30–38 where it extends from the circumferential lip 52. The circumferential lip 52 and ledges 54 form an abutment surface which preferably engages with a front edge 55 formed by the canister mouth 40 such that during assembly upon snap-fit engagement of the male insert portions with the female receiving portions, the cover is snugly biased against and retained with the canister which significantly enhances fit and finish of the cover when assembled to an instrument panel and eliminates any vibration or loose fit while in use. Preferably, the module reaction canister 14 is die-cast from an aluminum alloy in order to create a light-weight and strong structure which resists deformation caused from forces produced during inflation of the air bag, particularly about the canister mouth 40. Furthermore, the mounting ears 42–47 and the female receiving portions 16–24 are preferably integrally formed with the canister during the die-cast process. The resulting reaction canister provides a strong and lightweight structure for mounting the air bag module in a vehicle structure which further resists the inflation forces created during air bag deployment.

Preferably, the female receiving portions 16–24, as well as the male insert portions 30–38 are asymmetrically arranged about the module and cover, respectively, in order to prevent inadvertent upside down assembly of the cover to the canister. For example, male insert portion 32 and female receiving portion 18 are formed with a double latch therebetween such that receiving portion 18 is provided with a pair of latches 28 which mate with a complementary pair of receiving holes 39 on insert portion 32. In this case, the through slot 27 on female receiving portion 18 is wider than those for the remaining receiving portions such that only male insert portion 32, which is likewise enlarged, will mate within portion 18. Additionally, the enlarged male insert portion 32 will not fit in any other female receiving portion.

As further shown in FIGS. 2–5, each latch 28 has a ramp face 64 proximate to the guide 26 such that passage of a male insert portion 30–38 through the guide forces the end of the male portion against the ramp face which compliantly biases the end of the male insert portion away from the canister surface 67 until a complementary receiving hole 39 on the male insert portion passes over the latch 28 with which it suddenly snap-action engages, allowing for resilient relaxation of the previously bent male insert portion against the canister surface 67. As shown in FIG. 4, a pair of male insert portions 31 and 38 are shown snap-fit engaged to corresponding female receiving portions 17 and 24 such that engagement of a lip face 66 formed by each latch prevents disengagement of each male insert portion from each respective female receiving portion. Furthermore, as shown in FIG. 3, each lip face 66 forms an arcuate, or semi-circular, vertical face in relation to the canister surface 67 which enhances snap-action engagement between each latch and receiving hole since each receiving hole has a corresponding longer arcuate dimension even where dimensional variations in parts are present. For example, thermal variations and stresses often result when molding a part, and the positions of each male insert portion might fluctuate relative to one another when molding the cover. By providing such lip face 66 and a receiving hole 39, snap-fit engagement can be assured between male insert portions and mating female portions due to elimination of sharp corners on each latch. As further shown in FIG. 5, entrance 70 on guide 26 is enlarged in relation to exit 72 in order to encourage each male insert portion in a guided manner through each guide 26 where it is more snugly through-retained along the exit 72. Preferably, the entrance is enlarged relative to the exit by providing a 2° ramp angle on a bottom face 74 within each guide 26. Furthermore, such ramping of the bottom face assists in urging a respective male insert portion in slightly laterally biased engagement with a respective ramp face 64 such that the male insert portion is encouraged to laterally bias apart from the canister surface 67 during snap-fit engagement of the male insert portion with the respective female receiving portion.

Additionally, it is preferable when forming the male insert portions 30–38 on module cover 12 to inwardly bias opposed tabs which further assures retention of each male insert portion with its respective mating female portion. As shown in FIG. 6, tabs 31 and 38 are each inwardly biased at an angle of 20, forming a 4° inward bias between the respective insert portions. Such inward bias further enhances the engagement of each male and female insert portion, in addition to the previously mentioned 2° ramp angle formed on each guide bottom face 74.

As further shown in FIGS. 1 and 4, a plurality of substantially circumferentially extending reinforcing ribs 76–79 are formed on the back face of a lip flange 80 which is defined by a portion of cover front face 50 which extends outwardly beyond the circumferential lip 52. Reinforcing rib 79 only partially extends about lip flange 80, and an upper edge of lip flange 80 forms a lip edge 82 which end-edge biases against a recessed receiving opening 84 formed in a vehicle instrument panel skin 86 which provides backup structure 88 for supporting the lip flange 80. The ribs allow molding of the cover lip flange 80 from thin material while still maintaining structural rigidity along the cover. Furthermore, structural members 90–92 are provided within the instrument panel 94 to which mounting ears 42–47 are retained with threaded fasteners 96.

To assemble the module cover 12 to the module reaction canister 14, the canister is first mounted to an instrument panel with fasteners via the mounting ears 42–47. Preferably, an inflator module 15 is already received and retained within the canister via mounting and alignment holes 62. Likewise, a folded air bag 13 is then received within the canister prior to snap-fit engagement of the cover to the canister. Subsequently, the male insert portions 30–38 are aligned with the canister female receiving portions 16–24 and the cover is urged in mating engagement with the canister in a compliant manner until all of the respective receiving holes are snap-fit engaged to such corresponding latches. The reinforcing ribs 76–79 on the back face of cover 12 further resiliently coact with the instrument panel lip edge 85 such that the ribs are compressively biased as the cover is urged onto the canister until the cover snaps to the canister. The ribs which are flexed in the final assembled state bias the cover in relation to an instrument panel to prevent movement and vibration therebetween. Such coaction of the reinforcing ribs with the lip edge 85 enhances fit and finish of the cover in relation to an instrument panel skin 86 by minimizing or eliminating any slack or play between the cover and skin, and also assists in assuring positive retention of the respective male insert portions and female receiving portions.

Additionally, as shown in FIGS. 3 and 6, a resilient tang 98 and 100 is provided on each side of each male insert portion 30–38 adjacent its base 102 which extends from ledge 54. Each tang is separated from the adjacent male insert portion by a relief notch 101 and is positioned such that each tang is forcibly flexed against a respective guide 26 to elastically deform the tang in conjunction with snap-fitting of each male insert portion with a respective female receiving portion where lip face 66 seats and engages with a receiving hole 39 in the male insert portion. The tangs serve to engage the lip face 66 forcibly with the receiving hole 39 to obtain a snug and positively engaging fit that more reliably retains the male and female portions during deployment of an air bag through the cover 12.

Alternatively, the module cover 12 can be two-shot insert molded which allows for construction of the cover front face 50 from one material and the male insert portions from another material. Such construction provides for utilization of one plastic material for the cover face having material properties which create an aesthetic surface, and a second material for the male insert portions having superior properties which provide strong and resilient spring biasing characteristics. Further alternatively, the male insert portions can be provided on the module reaction canister 14 by molding the canister of a plastic material, and the female receiving portions can be provided on the circumferential lip 52 of the module cover. Further variations include providing some of the male insert portions on the cover and other of the male insert portions on the canister, with corresponding complementary female receiving portions provided on the canister and cover.

It is to be understood that the invention is not limited to the exact construction illustrated and described above, but that various changes and modifications may be made without departing from the spirit and scope of the invention as defined in the following claims.

I claim:

1. An improved passenger air cushion module for use in retaining an air cushion restraint system and a pressurized gas source for inflation thereof for presentment to a motor vehicle occupant, the module comprising:

a deployment cover having a central face portion with a tear seam pattern for deploying an air bag therethrough and an outer peripheral portion;

a reaction canister having a mouth along which said cover outer peripheral portion is retained;

a plurality of complementary pairs of mating male and female fastening portions engageable for coupling in one-way substantially simultaneous snap-action engagement, one of said portions provided on said cover peripheral portion, the other provided on said canister proximate said mouth, said female portions each forming a guide having a through-slot for receiving and surrounding the associated male portion and said female portions each including means for laterally biasing said male portions during assembly of said cover to said canister; and wherein said plurality of complementary pairs of mating fastening portions are provided spaced apart from one another about said outer peripheral portion of said cover and said canister mouth such that for each pair, one of said mating portions is provided on said cover and the other is provided on said canister in an aligned arrangement with one another, said male portions all extending in substantially the same direction and being substantially aligned with said through-slots formed by said female portions wherein said cover can be assembled to said canister by movement of said cover onto said canister with substantially simultaneous engagement of all of said plurality of complementary pairs of mating male and female fastening portions.

2. The improved passenger air cushion module of claim 1 wherein said pairs of mating fastening portions are provided in an asymmetric arrangement about said outer peripheral portion of said cover and said canister mouth which prevents inadvertent upside-down attachment of said cover to said canister.

3. The improved passenger air cushion module of claim 1 wherein one of said male fastening portions comprises a male insert portion with a receiving hole and wherein said means for laterally biasing said male portions of one of said female fastening portions comprises a ramp latch, wherein said male insert portion is insert received through said guide in flexed and biased engagement with said ramp latch until snap-action engagement therebetween as said receiving hole overlays said latch.

4. The improved passenger air cushion module of claim 3 wherein said female portion through-slot is provided adjacent said male fastening portion, and said ramp latch is provided distal said male fastening portion such that said ramp latch forms a ramp face proximate said male fastening portion for resiliently and slidably receiving said male insert portion along in biased engagement with said ramp latch such that said male insert portion receiving hole snap-action engages with said ramp latch.

5. The improved air cushion module of claim 4 wherein said ramp latch terminates at an elevated end in a semi-circular lip face which extends substantially perpendicular to said male insert portion in an assembled state, wherein said male insert portion receiving hole defines a substantially complementary semi-circular abutment portion having a radius at least as large as said semi-circular lip face such that said abutment portion engages with said lip face in assembly.

6. The improved air cushion module of claim 4 wherein said male insert portion has at least one resilient tang engageable with said female fastening portion in biased relation therewith upon snap-action engagement of said male and female insert portions for maintaining positive engagement therebetween.

7. The improved passenger air cushion module of claim 1 wherein said cover outer peripheral portion extends beyond a circumferential lip defining said central face portion about which said outer peripheral portion extends therefrom for flush mounting against an instrument panel.

8. The improved passenger air cushion module of claim 7 wherein a plurality of reinforcing ribs extend from a backface of said outer peripheral portion for reinforcement therefrom.

9. The improved passenger air cushion module of claim 1 wherein said reaction canister has a plurality of mounting ears extending therefrom for mounting to a vehicle instrument panel.

10. The improved passenger air cushion module of claim 3 wherein said male fastening portions extend from said cover and said female fastening portions extend from said canister.

* * * * *